United States Patent

Novak et al.

Patent Number: 5,267,543
Date of Patent: Dec. 7, 1993

[54] DUAL INDUCTION SYSTEM FOR INTERNAL COMBUSTION ENGINE

[75] Inventors: James M. Novak, Dearborn Heights; William F. Stockhausen, Northville; Timo A. Wiemero, Canton, all of Mich.

[73] Assignee: Ford Motor Company, Dearborn, Mich.

[21] Appl. No.: 993,534

[22] Filed: Dec. 21, 1992

[51] Int. Cl.⁵ .............................................. F02M 35/10
[52] U.S. Cl. .................................. 123/306; 123/52 M; 123/188.14
[58] Field of Search ........ 123/52 M, 52 MC, 52 MV, 123/188.14, 306, 308

[56] References Cited

U.S. PATENT DOCUMENTS

| | | | |
|---|---|---|---|
| 3,318,292 | 5/1967 | Hideg | 123/188.14 |
| 4,256,062 | 3/1981 | Schafer | 123/52 M |
| 4,428,334 | 1/1984 | Klomp | 123/188.14 |
| 4,448,164 | 5/1984 | Ishida | 123/432 |
| 4,481,922 | 11/1984 | Sugiura | 123/306 |
| 4,485,775 | 12/1984 | Kanda et al. | 123/188.14 |
| 4,499,868 | 2/1985 | Kanda et al. | 123/188.14 |
| 4,519,350 | 5/1985 | Oda et al. | 123/308 |
| 4,520,776 | 6/1985 | Ishida et al. | 123/308 |
| 4,543,931 | 10/1985 | Hitomi et al. | 123/308 |
| 4,550,699 | 11/1985 | Okumura et al. | 123/308 |
| 4,567,860 | 2/1986 | Sugiyama | 123/188.14 |
| 4,598,678 | 7/1986 | Kobayashi et al. | 123/306 |
| 4,612,903 | 9/1986 | Urabe et al. | 123/188.14 |
| 4,699,104 | 10/1987 | Okumura | 123/308 |
| 4,702,207 | 10/1987 | Hatamura et al. | 123/302 |
| 4,834,035 | 5/1989 | Shimada et al. | 123/188.14 |
| 4,844,040 | 7/1989 | Leighton et al. | 123/306 |
| 4,919,086 | 4/1990 | Shillington | 123/306 X |
| 4,919,092 | 4/1990 | Smith, Jr. et al. | 123/188.14 |
| 4,930,468 | 6/1990 | Stockhausen | 123/188.14 |
| 5,076,224 | 12/1991 | Smith, Jr. et al. | 123/188.14 |
| 5,081,974 | 1/1992 | Chikamori et al. | 123/52 M |
| 5,127,370 | 7/1992 | Suzuki et al. | 123/52 MV |

Primary Examiner—Willis R. Wolfe
Attorney, Agent, or Firm—Jerome R. Drouillard; Roger L. May

[57] ABSTRACT

A multicylinder reciprocating internal combustion engine with a dual induction system having at least one exhaust poppet valve and a single intake poppet valve for each cylinder, with the intake valve being located so as to control the flow of charge into the cylinder. Each intake port has a vertical wall dividing the port into primary and secondary passages, with the primary passages being oriented so as to cause rotational flow about the outermost portion of the cylinder, and with the secondary passages being oriented so as to cause flow directed about a radially inward portion of the cylinder. Low-speed and high-speed intake runners extend from an intake plenum to the primary and secondary intake port passages.

8 Claims, 2 Drawing Sheets ered as a multicylinder reciprocating internal combustion engine having a dual induction system according to the present invention comprises an engine, 10, with a plurality of cylinders, 12. The cylinders may be arranged either in an in-line configuration,

DUAL INDUCTION SYSTEM FOR INTERNAL COMBUSTION ENGINE

BACKGROUND AND SUMMARY OF THE INVENTION

This invention relates to an internal combustion engine having a single intake valve for each cylinder, which is fed fresh intake charge by primary and secondary intake port passages. Flow through the secondary passage is selectively controlled according to an engine control algorithm.

An internal combustion engine having a single intake valve and dual intake manifold runners is disclosed in U.S. Pat. No. 4,930,468 which is assigned to the Assignee of the present invention. In an engine according to the present invention, a single intake poppet valve is located so as to control the flow of charge into the cylinder. An intake port, which conducts fresh charge to the intake valve, has a vertical dividing wall separating the port into primary and secondary passages, with the primary passage being oriented so as to cause rotational flow in the cylinder about the outermost portion of the cylinder. The secondary passage is oriented so as to cause flow directed about a radially inward portion of the cylinder. A secondary throttle valve located within the secondary passage selectively controls the flow therethrough, according to an engine control strategy. Air enters the engine via one or more intake plenums having at least one throttled charge air inlet and a plurality of primary and secondary outlets. Each engine cylinder is fed from the intake plenum via two runners. A first, or low-speed, intake runner extends from one of the primary outlets in the intake plenum to the primary port passage of each cylinder and a high-speed intake runner extends from one of the secondary outlets of the intake plenum to a secondary port passage of each cylinder. The relative lengths of the runners are selected so as to achieve desirable high-speed and low-speed tuning. The present dual induction system provides the opportunity to separate the primary and secondary passages in the intake port, as well as their respective runners, for the entire distance extending between the intake valve and the plenum. The length and cross-sectional flow areas of the runners may be optimized according to Helmholtz resonator theory or by other computer based wave dynamics calculations, or by empirical testing, to provide a ram tuning effect to increase the full load output of the engine at both low and high engine speeds.

DETAILED DESCRIPTION OF THE PREFERRED EMBODIMENTS

As shown in the figures, a multicylinder reciprocating internal combustion engine having a dual induction system according to the present invention comprises an engine, 10, with a plurality of cylinders, 12. The cylinders may be arranged either in an in-line configuration, as shown in FIG. 1, or, as shown in FIG. 2, a V-configuration, with only one of the two cylinder banks being illustrated, it being understood that the second cylinder bank replicates the hardware of the first cylinder bank.

Figure 1:
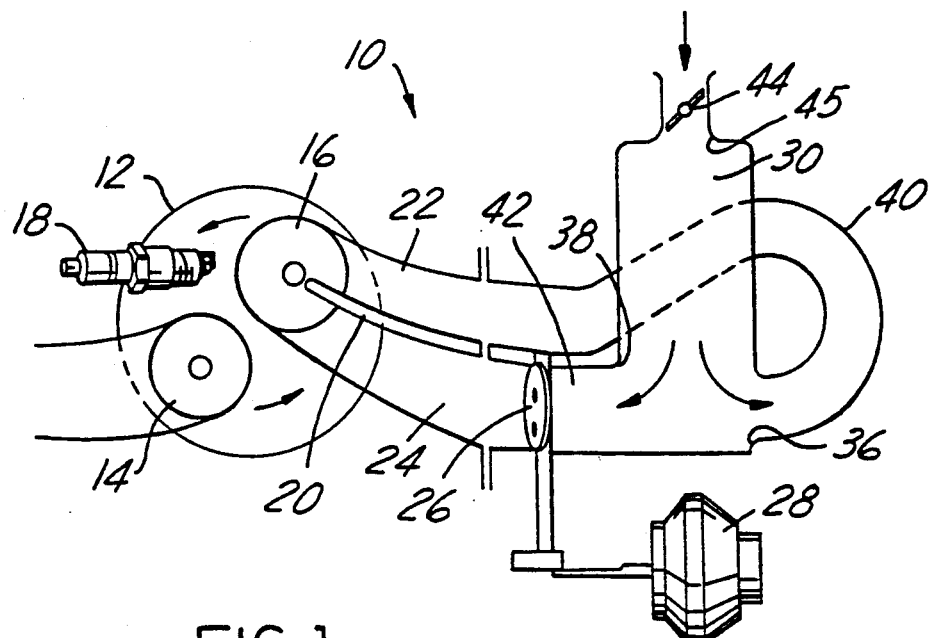
FIG. 1 is an illustration of an in-line engine with a single cylinder being shown, according to one aspect of the present invention.
Figure 2:
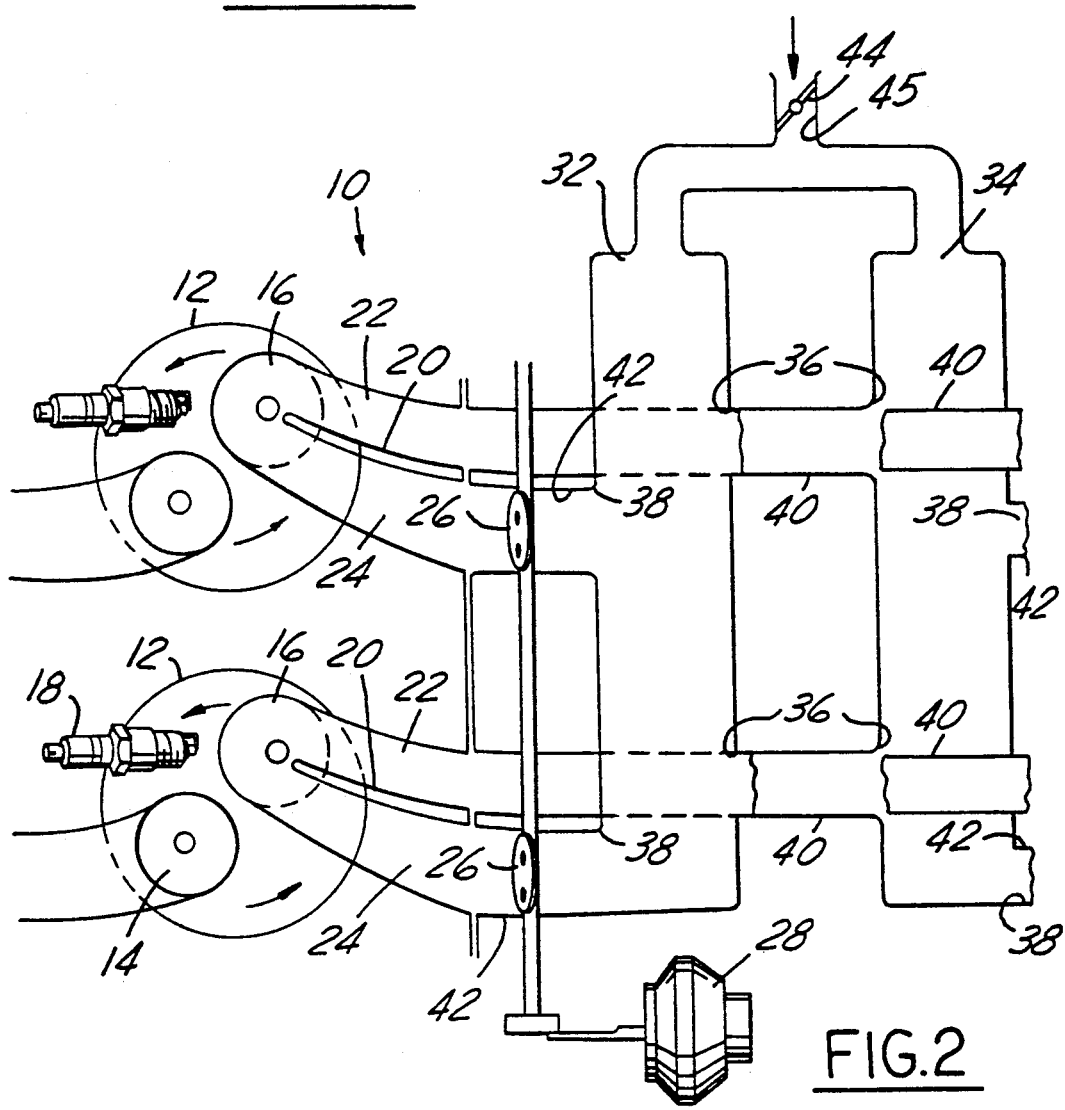
FIG. 2 is an illustration of a portion of a V-block engine, according to another aspect of the present invention.

Continuing now with FIG. 1, engine 10 having cylinder 12 is equipped with an exhaust valve, 14, and a single intake poppet valve, 16. A sparkplug 18 serves to ignite the mixture in the cylinder. An intake port comprising a primary port passage, 22, and a secondary port passage, 24, feeds each intake valve 16. Note that the primary and secondary port passages are defined in part by a vertical dividing wall 20 which separates the passages and which extends entirely from the bottom to the top of the flow passage.

The primary and secondary port passages are each fed by means of individual runners, with each runner being individually attached to a common intake plenum, 30, for the in-line configuration of FIG. 1. Gross airflow through the engine is controlled by means of a throttle valve, 44, located in the plenum inlet, 45. A low-speed runner, 40, which is attached to a primary outlet, 36, of intake plenum 30, extends to primary port passage 22. Conversely, a high-speed runner, 42, extends from a secondary outlet, 38, to join with secondary port passage 24. Note that low-speed runner 40 is significantly greater in length than is high-speed runner 42. This allows the engine to be tuned for optimum breathing across the total speed range of operation. It should also be noted that the arrangement described herein for the dual induction passages allows a separation of the passages at all points downstream from plenum 30.

The flow of charge through primary port passage 22 produces a rotational flow about the outermost portion of cylinder 12. This rotational flow, sometimes referred to as "swirl", is counterclockwise as viewed in FIGS. 1 and 2. The rotation occurs about an axis which is coincident with the centerline of the cylinder 12. Flow through secondary port passage 24 causes much less rotation within cylinder 12 because the fluid flows into a radially inward portion of cylinder 12. The reduced rotational impetus attributable to flow through passage 24 may be tolerated because a secondary throttle, 26, which controls flow through runner 42 and secondary passage 24, will generally be open at higher engine speeds, which are accompanied by vigorous rotational flow produced by primary port passage 22.

Secondary throttle 26 is operated by an actuator, 28, which is controlled by an engine controller, which could be an electronic, pneumatic, manual, or other type of controller known to those skilled in the art and suggested by this disclosure. In general, actuator 28 will control secondary throttle 26 so that the secondary throttle is open when engine speed exceeds a threshold value, regardless of engine load. And, secondary throttle 26 may further be controlled such that the secondary throttle is open at any engine speed if engine load exceeds a threshold value. Those skilled in the art will appreciate in view of this disclosure that several different control algorithms could be used for the purpose of controlling secondary throttle valve 26 according to the present invention.

Turning now to FIG. 2, one cylinder bank and the induction system of a V-type engine are illustrated. With the engine shown in FIG. 2, the bank of cylinders 12 would be replicated with an additional bank extending on the opposite side of plenums 32 and 34. These volumes provide charge air to the opposite cylinder banks as follows. Note that the illustrated cylinder bank has cylinders which in each case receive air from a longer low-speed runner 40 and a shorter high-speed runner 42. It has been determined empirically that for an automotive engine intended to operate at speeds up to 5,000 rpm, the length of high-speed runners 42 will preferably lie between 50 percent and 95 percent of the length of low-speed runners 40. The combined length of low-speed runner 40 and primary port passage 22 for each cylinder should be between 3 and 6 times the length of the stroke of the engine. The combined cross-sectional areas of primary port passage 22 and secondary port passage 24 for each cylinder should be between 15 percent and 28 percent of the cross-sectional area of the cylinder itself.

It has additionally been determined empirically that the cross-sectional area of primary port passages 22 should be between 76 percent and 100 percent of the cross-sectional area of each secondary port passage 24. It has further been determined that the area of the head of intake valve 16 should be between 88 percent and 102 percent of the combined cross-sectional areas of the associated primary port passage 22 and secondary port passage 24. Finally, the total volume of the secondary passages extending from the secondary throttle valves 26 to intake valves 16 should not exceed 15 percent of the displaced volume of the engine. This 15 percent factor will provide optimum swirl or rotational intensity because it is understood that when secondary throttle valve 26 is closed, the volume trapped between secondary throttle valve 26 and intake valve 16 must also be drawn into cylinder 12 before appreciable flow starts within primary port passage 22. It will be understood that the remainder of the cylinder filling occurs solely through primary port passage 22, thus generating the previously described rotational or swirl flow. Stated otherwise, the volume of each secondary passage 24 extending from its associated secondary throttle valve 26 to the associated intake poppet valve 16 should not exceed 15 percent of the swept volume of the cylinder.

The arrangement shown in FIG. 2 conveniently provides that each of the low-speed runners 40 is attached to a plenum chamber which is opposite the cylinder bank being fed by the particular low-speed runner. For example, low speed runners feeding the illustrated left-hand cylinder bank of FIG. 2 are fed from plenum volume 34. This allows the increased length needed for the low speed runner. Conversely, the adjacent plenum to the cylinder bank, i.e., 32, feeds high-speed runner 24 directly.

Figure 3:
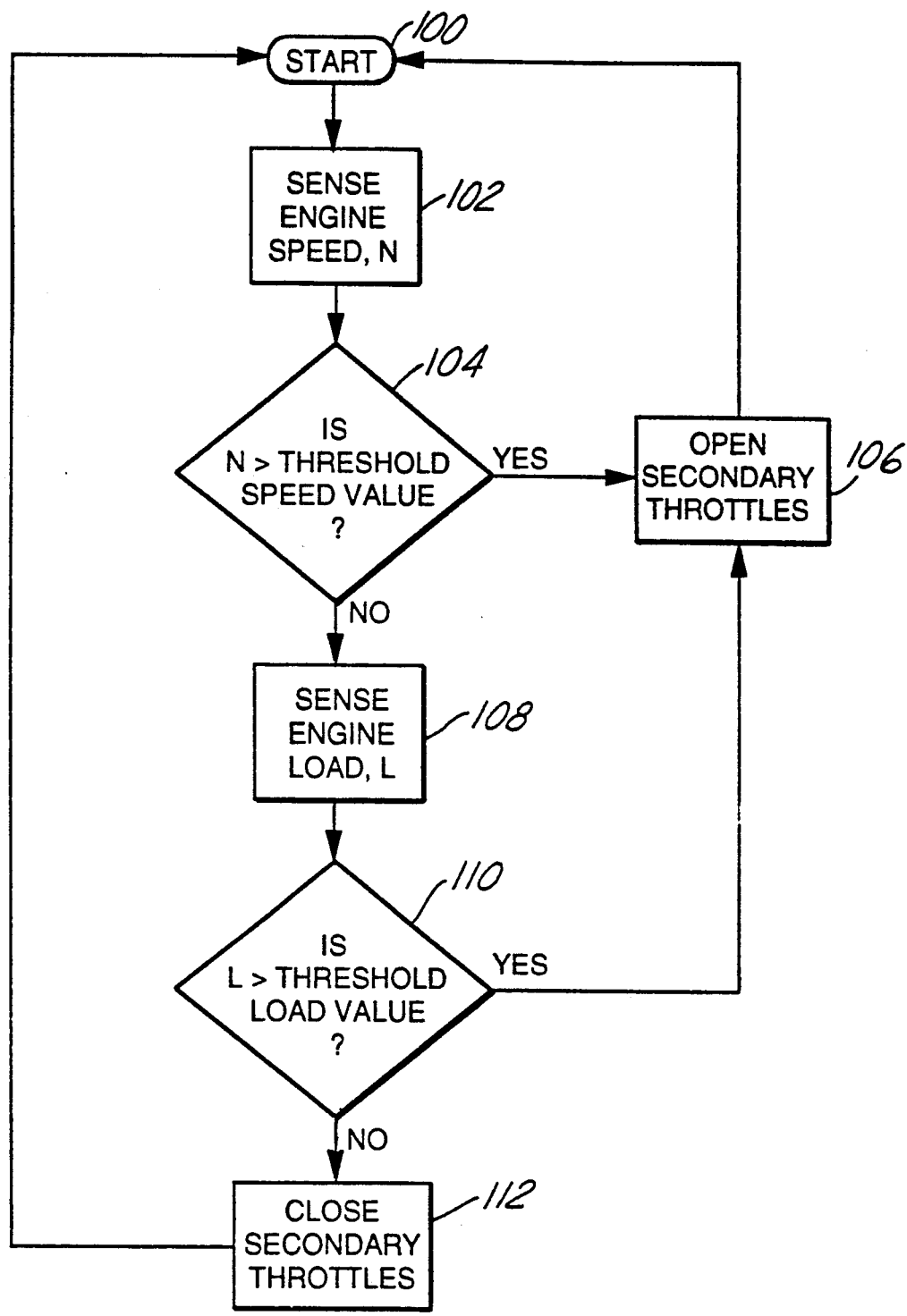
FIG. 3 is a flow chart of a method according to one aspect of the present invention.

According to another aspect of the present invention which is shown in FIG. 3, a method for controlling secondary throttle valves 26 comprises the steps of sensing engine speed and load and opening the secondary throttle valves either if sensed engine speed exceeds a threshold speed value or if sensed engine load exceeds a threshold load value, regardless of engine speed. Engine speed and load may be sensed by conventional electronic engine control sensors which are currently in use, with actuator 28 being controlled by any conventional engine control computer known to those skilled in the art and suggested by this disclosure.

As shown in FIG. 3, a method of operating secondary throttle valves 26 begins at block 102 with the sensing of engine speed. At block 104, the engine's speed is compared with a threshold value. If the speed is less than the threshold, the algorithm dictates that the program continue to block 108. If, however, engine speed exceeds the threshold speed value, the program commands actuator 28 to open the secondary throttles at block 106.

In the event that the question at block 104 is answered in the negative, the engine's load will be sensed at block 108. Thereafter, at block 110 the sensed load will be compared to a threshold load value. If the sensed load exceeds the threshold value, the secondary throttles will be opened at block 106 regardless of the current engine speed. If, however, the sensed engine load is less than the threshold value, a command to close the secondary throttles will be given at block 112. Thereafter, the program will continue to run beginning with block 100.

We claim:

1. A multicylinder reciprocating internal combustion engine with a dual induction system, with said engine comprising:

at least one exhaust poppet valve and a single intake poppet valve for each cylinder, with the intake valve being located so as to control the flow of charge into the cylinder;

a plurality of intake ports for conducting fresh charge to each intake valve, with each of said ports having a vertical dividing wall separating the port into primary and secondary passages, with the primary passage being oriented so as to cause rotational flow about the outermost portion of the cylinder, and the secondary passage being oriented so as to cause flow directed about a radially inward portion of the cylinder;

a secondary throttle valve located within each of said secondary passages, for selectively controlling the flow therethrough;

an intake plenum having at least one throttled charge air inlet and a plurality of primary and secondary outlets;

a low-speed intake runner extending from each of said primary outlets to one of said primary port passages wherein the multiple cylinders of the engine are arranged in a two-bank, V configuration, with said intake plenum comprising two separate volumes situated between the banks and extending parallel to the engine's longitudinal axis, with the primary outlets of each volume feeding the low-speed runners of the adjacent cylinder bank and with the secondary outlets of each volume feeding the high-speed runners of the opposite cylinder bank.

2. A multicylinder reciprocating internal combustion engine with a dual induction system, with said engine comprising:

at least one exhaust poppet valve and a single intake poppet valve for each cylinder, with the intake valve being located so as to control the flow of charge into the cylinder;

a plurality of intake ports for conducting fresh charge to each intake valve, with each of said ports having a vertical dividing wall separating the port into primary and secondary passages, with the primary passage being oriented so as to cause rotational flow about the outmost portion of the cylinder, and the secondary passage being oriented so as to cause flow directed about a radially inward portion of the cylinder;

a secondary throttle valve located within each of said secondary passages, for selectively controlling the flow therethrough;

an intake plenum having at least one throttled charge air inlet and a plurality of primary and secondary outlets;

a low-speed intake runner extending from each of said primary outlets to one of said primary port passages; and a high-speed intake runner extending from each of said secondary outlets to one of said secondary port passages with the length of said high speed runners being between 50 and 95 percent of the length of said low speed runners.

3. An internal combustion engine according to claim 1, wherein the combined length of the low speed runner and the primary port passage for each of said cylinders is between 3 to 6 times the length of the stroke of said engine.

4. An internal combustion engine according to claim 1, wherein the combined area of the primary and secondary port passages for each of said cylinders is between 15 and 28 percent of the cross-sectional area of said cylinder.

5. An internal combustion engine according to claim 1, wherein the cross-sectional area of each of said primary port passages is 76 to 100 percent of the cross-sectional area of each of said secondary port passages.

6. An internal combustion engine according to claim 1, wherein the area of the head of each intake poppet valve is 88 to 102 percent of the combined cross-sectional area of the primary and secondary port passages feeding each cylinder.

7. An internal combustion engine according to claim 1, wherein the volume of each secondary passage extending from a secondary throttle valve to the associated intake poppet valve does not exceed 15 percent of the swept volume of the associated cylinder.

8. An internal combustion engine according to claim 1, wherein the multiple cylinders of the engine are arranged in a single bank.

* * * * *